US009962249B2

(12) United States Patent
Newby et al.

(10) Patent No.: US 9,962,249 B2
(45) Date of Patent: May 8, 2018

(54) MOBILITY AID FOR QUADRUPEDS

(71) Applicant: Sylvan, Inc., N. Myrtle Beach, SC (US)

(72) Inventors: Sylvan Newby, N. Myrtle Beach, SC (US); Dean Pullen, Henderson, IA (US)

( * ) Notice: Subject to any disclaimer, the term of this patent is extended or adjusted under 35 U.S.C. 154(b) by 3 days.

(21) Appl. No.: 14/811,885

(22) Filed: Jul. 29, 2015

(65) Prior Publication Data

US 2017/0027676 A1 Feb. 2, 2017

(51) Int. Cl.
*A01K 15/02* (2006.01)
*A61D 3/00* (2006.01)

(52) U.S. Cl.
CPC .......... *A61D 3/00* (2013.01); *A61D 2003/006* (2013.01)

(58) Field of Classification Search
CPC ............................ A61D 3/00; A61D 2003/006
USPC ................................. 119/727; 280/657, 290
See application file for complete search history.

(56) References Cited

U.S. PATENT DOCUMENTS 2,546,726 A * 3/1951 Creamer, Jr. .......... A01K 13/00 119/727
4,375,203 A * 3/1983 Parkes ..................... A61D 9/00 119/727
4,777,910 A * 10/1988 Pecor ................... A01K 15/027 119/702
5,224,444 A 7/1993 Hill et al.
6,820,572 B1 * 11/2004 Parkes ................... A01K 15/00 119/727
7,549,398 B2 * 6/2009 Robinson ................. A61D 3/00 119/727
2013/0104813 A1 5/2013 Shalom
2016/0030273 A1 * 2/2016 Han ......................... A61H 3/04 180/2.2

FOREIGN PATENT DOCUMENTS

WO WO 2011027088 A1 * 3/2011 ............... A61D 3/00

* cited by examiner

*Primary Examiner* — David J Parsley
*Assistant Examiner* — Daniella A Clerkley
(74) *Attorney, Agent, or Firm* — Law Office of Ilya Libenzon

(57) ABSTRACT

A mobility aid for quadrupeds includes a support frame having a front end and a rear end, at least one leg member having a distal end and a proximal end connected to the support by a joint, the joint permitting the leg member to pivot between an upright position and a folded position, the joint further comprising a biasing means that urges the at least one leg element toward the upright position, at least one wheel at the distal of the at least one leg member, and at least one actuator attached to the at least one leg member, the at least one actuator contacting the ground on an opposite side of one of at least one wheel from the front end of the support.

20 Claims, 5 Drawing Sheets

MOBILITY AID FOR QUADRUPEDS

TECHNICAL FIELD

The device and methods disclosed herein relate generally to mobility aids for animals, and particularly to adjustable mobility aids for quadrupeds.

BACKGROUND ART

Pets can suffer from a number of conditions that lead to loss of mobility. Many of these conditions, such as degenerative myelopathy, arthritis, spondylosis deformans, and various forms of osteoarthritis, can cause the rear limbs of quadrupeds such as dogs and cats to lose some or all of the function in their hind legs. Injuries can also limit the ability to walk in the short term or long term, depending on the type and severity of the injury. Whether temporary or permanent, this incapacity can be injurious to the health of the animal, and demoralizing for both pet and owner.

Although some wheelchairs or mobile sling assemblies have been designed, the existing forms do not adapt well enough to the needs of the individual animal; either they do not give the animal the option of natural mobility or they do not easily adjust to the animal's size and body type.

Therefore, there remains a need for a mobile and flexible pet mobility aid that is also readily adjustable.

SUMMARY OF THE EMBODIMENTS

In one aspect, a mobility aid for quadrupeds includes a support frame having a front end and a rear end. The mobility aid includes at least one leg member having a distal end and a proximal end connected to the support frame by a joint, the joint permitting the leg member to pivot between an upright position and a folded position, the joint further including a biasing means that urges the at least one leg element toward the upright position. The mobility aid includes at least one wheel at the distal end of the at least one leg member. The mobility aid includes at least one actuator attached to the at least one leg member, the at least one actuator contacting the ground on an opposite side of one of at least one wheel from the front end of the support.

In a related embodiment, the support frame further includes two lateral bars having adjustable lengths. In another embodiment, the mobility aid includes at least one strap to secure a quadruped in the support frame. Another embodiment includes at least one harness to secure a quadruped in the support frame. In an additional embodiment, the at least one harness also includes a front harness securing the shoulders of the quadruped. In another embodiment still, the at least one harness additionally includes a rear harness securing the hips of the quadruped. In yet another embodiment, the at least one harness is adjustable. In another embodiment, the support frame further includes a sling hung between the two lateral bars. In an additional embodiment, the sling has an adjustable depth.

In another embodiment, the at least one leg member has an adjustable length. In still another embodiment, the biasing means of the at least one joint has an adjustable bias. An additional embodiment also includes a leg support attached to the support frame. In another embodiment, the leg support includes at least one loop of flexible material suspended from the support frame. In yet another embodiment, the at least one loop is adjustable. In another embodiment still, the at least one loop is suspended from the support frame using an adjustable strap. A further embodiment also includes a suspension bar attached to the support frame near to the rear end of the lateral bars, and the leg support is suspended from the suspension bar.

In another aspect, a method for fitting a mobility aid to a quadruped includes providing a mobility aid as described above, further including at least one harness. The method includes placing a quadruped in the support frame. The method includes adjusting the harness to fit the quadruped.

A related embodiment also includes adjusting the bias of each biasing means. In additional embodiment the mobility aid further includes a leg support, and the method includes placing the hindlegs of the animal in the leg support. In yet another embodiment, the support frame includes two lateral bars have adjustable length, and the method also involves adjusting the length of the two lateral bars.

Other aspects, embodiments and features of the disclosed device and method will become apparent from the following detailed description of the invention when considered in conjunction with the accompanying figures. The accompanying figures are for schematic purposes and are not intended to be drawn to scale. In the figures, each identical or substantially similar component that is illustrated in various figures is represented by a single numeral or notation at its initial drawing depiction. For purposes of clarity, not every component is labeled in every figure. Nor is every component of each embodiment of the device and method is shown where illustration is not necessary to allow those of ordinary skill in the art to understand the device and method.

BRIEF DESCRIPTION OF THE DRAWINGS

The preceding summary, as well as the following detailed description of the disclosed device and method, will be better understood when read in conjunction with the attached drawings. It should be understood that the invention is not limited to the precise arrangements and instrumentalities shown.

DETAILED DESCRIPTION OF SPECIFIC EMBODIMENTS

Embodiments of the disclosed mobility aid permit pets with impaired hind limbs to stand up, lie down, and sit under their own power. Animals using disclosed embodiments can participate in normal activities such as playing and mealtimes. Some embodiments enable animals to socialize and relieve themselves where they would otherwise be unable to do so. The many adjustable features in some embodiments make the disclosed mobility aid customizable to particular animals' needs.

Figure 1A:
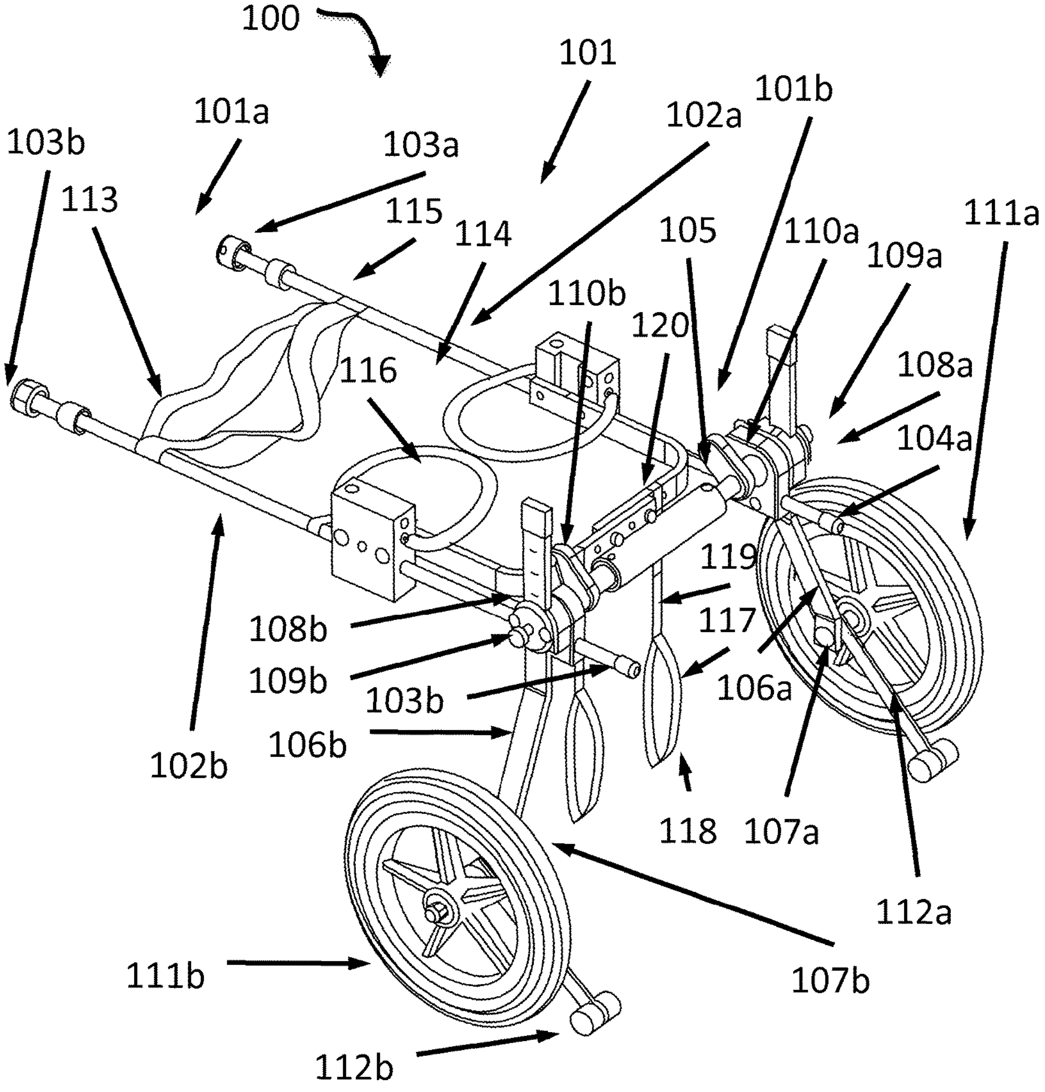
FIG. 1A is a schematic diagram depicting one embodiment of a mobility aid for quadrupeds.
Figure 1B:
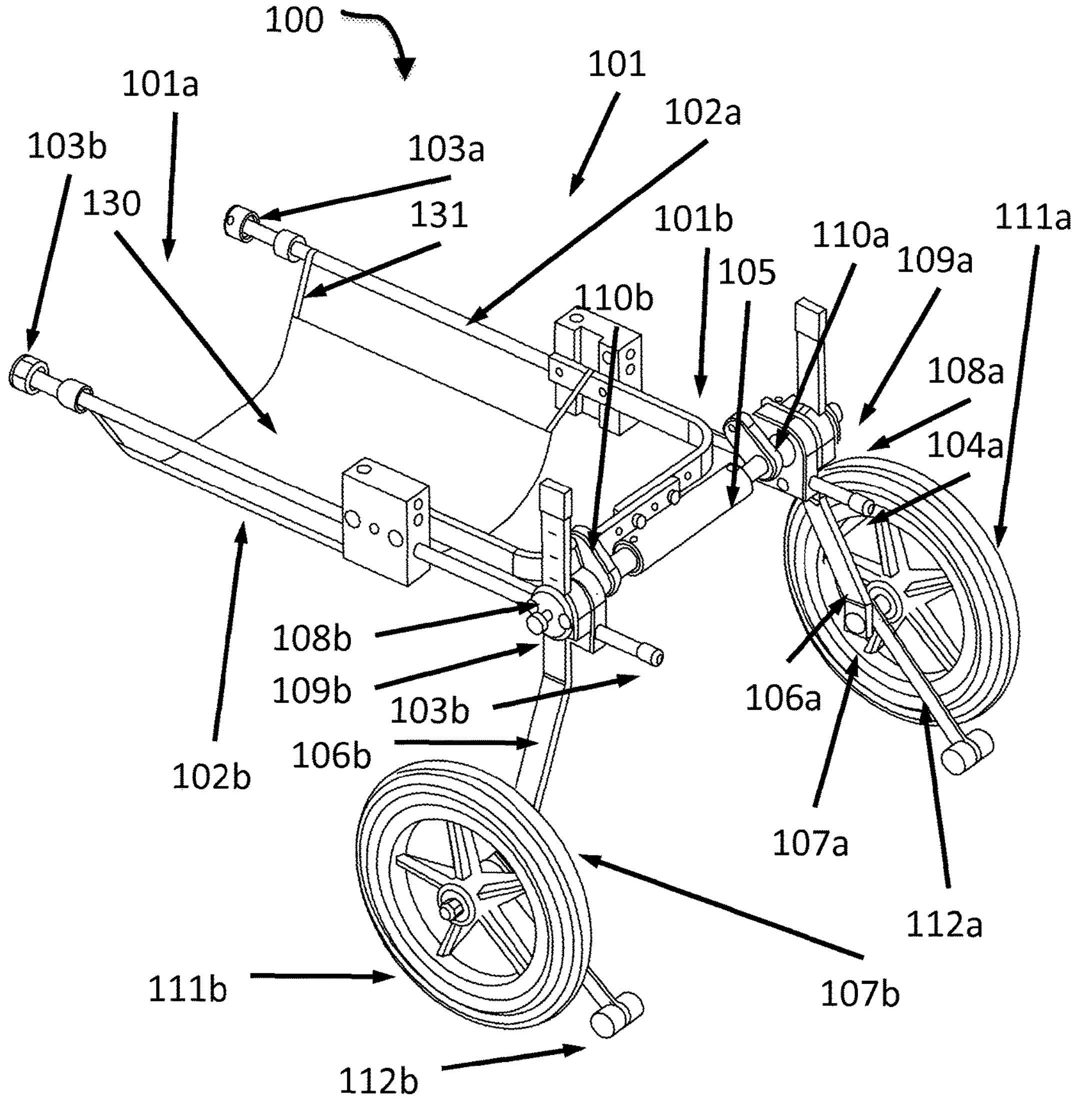
FIG. 1B is a schematic diagram depicting one embodiment of a mobility aid for quadrupeds.

FIGS. 1A-1B illustrate some embodiments of a mobility aid for quadrupeds 100. The mobility aid 100 includes a support frame 101 having a front end 101*a* and a rear end 101*b*. The mobility aid 100 includes at least one leg member 106*a* comprising a distal end 107*a* and a proximal end 108*a* connected to the support frame 101 via a joint 109*a*. The joint 109*a* permits the leg member 106*a* to pivot between an upright position and a resting position. The joint 109*a* further includes a biasing means 110*a* that urges the at least one leg element 106*a* toward the upright position. The mobility aid 100 includes at least one wheel 111*a* at the distal 107*a* of the at least one leg member 106*a*. The mobility aid 100 includes at least one actuator 112*a* attached to the at least one leg element 106*a*, the actuator 112*a* contacting the ground on an opposite side of the at least one wheel 111*a* from the front end 101*a* of the support frame.

The mobility aid 100 includes a support frame 101. In some embodiments, the support frame 101 is secured to the body of the quadruped as described in further detail below, and supports a portion of the weight of the quadruped's body. The support frame 101 may at least partially support the rear half of the quadruped; in some embodiments, as described in further detail below, the rear legs of the quadruped are supported off of the ground. In other embodiments, the rear legs of the quadruped are on the ground and can support some of the quadruped's weight.

The support frame 101 may include two lateral bars 102*a-b*, each lateral bar 102*a-b* having a front end 103*a-b* and a rear end 104*a-b*. Each lateral bar 102*a-b* may be substantially rigid. Each lateral bar 102*a-b* may be constructed from any suitable material or combination of materials. The materials making up the lateral bars 102*a-b* may include metal. The materials may include natural polymers. The materials may include synthetic polymers such as plastics. The materials may include wood. The materials may include ceramic. The materials may include crystalline material such as glass. The materials may include composite materials such as fiberglass. Each lateral bar 102*a-b* may have any cross-sectional form, including curved forms, polygonal forms, and forms combining curved and polygonal elements. The cross-sectional form of each lateral bar 102*a-b* may vary over the length of the lateral bar 102*a-b*. Each lateral bar 102*a-b* may be solid or hollow; for instance, each lateral bar 102*a-b* may include a hollow tube. Each lateral bar 102*a-b* may be made from a single piece of material, or from a plurality of pieces of material combined together.

In some embodiments, the two lateral bars 102*a-b* have adjustable lengths. As a non-limiting example, each lateral bar 102*a-b* may be made up of two or more telescoping sections. The telescoping sections may be secured to each other by a latch (not shown); the latch may connect a first section to a second section so that the first section and second section are fixed relative to one another. In some embodiments, the latch engages automatically; for instance, the latch may be housed in a chamber (not shown) in the first section may have a spring that urges the latch into a corresponding chamber (not shown) in the second section, fixing the first and second sections together. The latch may have a rounded end so that the exertion of force by a user on one of the sections in the direction in which the sections telescope together or apart will cause the latch to disengage; alternatively, the user may be able to access a handle to pull the latch back, disengaging the latch against the bias of the spring. In other embodiments, a screw (not shown) is included that may be turned in a first direction to fix the first section with respect to the second section, and may be turned in a second direction to disengage the first section with respect to the second section. Each lateral bar 102*a-b* may include a clamp that engages the first section to the second section when tightened. The lateral bars 102*a-b* may be straight, or they may be curved or made up of a plurality of straight sections joined at different angles. The lateral bars 102*a-b* may have both curved and angular portions. The lateral bars 102*a-b* may have identical forms. The lateral bars 102*a-b* may be mirror images of each other.

The support frame 101 may include a rear bar 105 substantially perpendicular to the two lateral bars 102*a-b*, with one end rigidly connected to each lateral bar 102*a-b* near to the rear end 104*a-b* of the lateral bar 102*a-b*. The rear bar 105 may be constructed as described above for lateral bars 102*a-b*. The rear bar 105 may connect directly to the lateral bars 102*a-b*, or the rear bar 105 may connect indirectly; for instance, the rear bar 105 may connect to the joints 109*a-b*, which in turn connect to the lateral bars 102*a-b*. The rear bar 105 is substantially perpendicular to the lateral bars 102*a-b*; in other words, a significant portion of the rear bar 105 may be perpendicular to a straight portion of each of the lateral bars 102*a-b*. Where the rear bar 105 or lateral bars 102*a-b* are not straight, a straight line connecting one end of the rear bar 105 to the other may be perpendicular to a straight line connecting the front end 103*a-b* to the back end 104*a-b* of either lateral bar 102*a-b*. Portions of the lateral bars 102*a-b* or rear bar 105 or both may be angled or curved away from the straight portions; for instance, there may be a curved corner connecting the lateral bars 102*a-b* to the rear bar 105.

In some embodiments, the mobility aid 100 includes at least one strap 113 to secure a quadruped in the support frame. The least one strap 113 may be composed of any material that is flexible. The at least one strap 113 may be composed at least in part of leather. The at least one strap 113 may be composed at least in part of rubber. The at least one strap 113 may be composed at least in part of a flexible polymer. The at least one strap 113 may be composed at least in part of natural textile. The materials composing the at least one strap 113 may include cotton; for instance, at least a part of the at least one strap 113 may be canvas. The at least one strap 113 may be composed at least in part of flax. The at least one strap 113 may be composed at least in part of hemp. The at least one strap 113 may be composed at least in part of Manila hemp. The at least one strap 113 may be composed at least in part of silk. The at least one strap 113 may be composed at least in part of animal hair, such as wool. The at least one strap 113 may be composed at least in part of a synthetic textile. The at least one strap 113 may be composed at least in part of nylon. The at least one strap 113 may be composed at least in part of polypropylene. The at least one strap 113 may be composed at least in part of polyester. The at least one strap 113 may be composed at least in part of ultra-high-molecular weight polyethylene. The straps 105 may be composed in part of a para-aramid synthetic fiber such as KEVLAR, as manufactured by E. I. du Pont de Nemours and Company of Wilmington, Del. In some embodiments, the at least one strap 113 is composed at least in part of flat webbing. In other embodiments, the at least one strap 113 is composed at least in part of tubular webbing. In some embodiments, the at least one strap 113 is an adjustable strap, defined as a strap whose working length may be increased or decreased by the user, for instance by passing an end of the strap through a tri-glide.

In some embodiments, the at least one strap 113 is attached to at least one fastener (not shown). In some embodiments, the at least one fastener is a snap. In some embodiments, the at least one fastener is a hook and loop fastener. In some embodiments, the at least one fastener is a button. In some embodiments, the at least one fastener is a buckle. The fastener is a hook-and-eye fastener in some embodiments. The fastener may be a cam buckle. The fastener may be a spring buckle. The fastener may be a slide release buckle. The fastener may be a double-loop frame style buckle. The fastener may be a single-loop frame style buckle. The fastener may be a prong frame-style buckle. The fastener may be a plate buckle. The fastener may be a box-out buckle. The fastener may be a clip buckle. The fastener may be a snap buckle. The fastener may be a clasp. The fastener may be a tension lock. The fastener may be a ladder lock. The fastener may be a tri glide.

The fastener may be adjustable, making at least one strap 113 adjustable as described above. Some fasteners, such as the double loop buckle or ladder lock, are inherently adjustable. A fastener that is not adjustable inherently may be made adjustable by including an adjustable form in its design. For example, either the male or female half of a slide-release buckle may be fused to a tension lock through which the at least one strap 113 is threaded, making the slide-release buckle adjustable. The fastener may be composed of any material of sufficient durability, hardness, and elasticity to perform the structural requirements of that type of fastener. The fastener may be metal. The fastener may be a hard polymer such as plastic. Where the fastener is a button, the fastener may be virtually any material sufficiently rigid to catch the buttonhole.

In some embodiments, the mobility aid 100 includes at least one harness 114 to secure a quadruped in the support frame. The at least one harness 114 may include at least one panel (not shown). A panel in some embodiments is a planar element. The panel may cover a portion of the quadruped's anatomy while the quadruped is in the at least one harness 114; in some embodiments, a panel acts to distribute pressure over a broader area than a strap 113 or set of straps 113 would if used for the same structural purpose. In some embodiments, the panel is rigid. The panel may be composed at least in part of metal. The panel may be a composed at least in part of a hard polymer such as plastic. In some embodiments the panel may be composed of any material or combination of materials listed above for straps 113. The panel may also be flexible. In some embodiments, the at least one harness 114 has padding. The padding may be composed at least in part of natural fibrous material. The padding may be composed at least in part of animal hair. The padding may be composed at least in part of wool. The padding may be composed at least in part of feathers. The padding may be composed at least in part of a vegetable fiber, such as cotton wool. The padding may be composed at least in part of an artificial fibrous material. The padding may be composed at least in part of a fibrous polymer material, such as polyester wool. The padding may be composed at least in part of a natural foam material. The padding may be composed at least in part of sponge. The padding may be composed at least in part of latex foam. The padding may be composed at least in part of a synthetic foam material. The padding may be composed at least in part of a polymer foam, such as polyurethane foam. The padding may be composed at least in part of a synthetic latex foam. The foam may be open-cell foam. The foam may be closed-cell foam. The foam may be dual-density foam. The foam may have multiple densities. The foam may be compression-molded.

In some embodiments, the at least one harness 114 includes a front harness 115 securing the shoulders of the quadruped. The front harness 115 may include a first portion that spans the chest of the quadruped on the rear side of the front legs. The first portion may include a panel. The first portion may include padding. The first portion may be adjustable; for instance, the first portion may be attached to the lateral bars 102*a-b* by one or more adjustable straps. The first portion may be detachable; the first portion may be attached to the lateral bars 102*a-b* directly or indirectly by way of a fastener (not shown). The front harness 115 may include a second portion that crosses the front of the quadruped on the frontward side of the front legs; in some embodiments, the front legs of the quadruped are inserted between the first portion and the second portion. The second portion may include a panel. The second portion may include padding. The second portion may be adjustable; for instance, the second portion may be attached to the lateral bars 102*a-b* by one or more adjustable straps. The second portion may be detachable; the second portion may be attached to the lateral bars 102*a-b* directly or indirectly by way of a fastener (not shown). The front harness 115 may include at least one third portion that passes over the back of the quadruped. The at least one third portion may include a panel. The at least one third portion may include padding. The at least one third portion may be adjustable; for instance, the at least one third portion may be attached to the lateral bars 102*a-b* by one or more adjustable straps. The at least one third portion may be detachable; the at least one third portion may be attached to the lateral bars 102*a-b* directly or indirectly by way of a fastener (not shown).

In some embodiments, the at least one harness 114 includes a rear harness 116 securing the hips of the quadruped. The rear harness 116 may include a fourth portion that passes beneath the body of the quadruped to the frontward side of the rear legs. The fourth portion may include a panel. In some embodiments, the panel is shaped to pass under the body of the quadruped and back across each side of the pelvis of the quadruped; the panel may have a substantially U-shaped profile when laid flat. The panel may have straps securing its most rearward points near the rear ends 104*a-b* of the lateral bars 102*a-b*. The panel may have straps securing its most forward upward points near the middle of the two lateral bars 102*a-b*, where the middle is the midpoint between the rear end 104*a-b* and the front end 103*a-b*. The fourth portion may include padding. The fourth portion may be adjustable; for instance, the fourth portion may be attached to the lateral bars 102*a-b* by one or more adjustable straps. The fourth portion may be detachable; the fourth portion may be attached to the lateral bars 102*a-b* directly or indirectly by way of a fastener (not shown). The rear harness 116 may have a fifth portion that passes over the back of the quadruped. The fifth portion may include a panel. The fifth portion may include padding. The fifth portion may be adjustable; for instance, the fifth portion may be attached to the lateral bars 102*a-b* by one or more adjustable straps. The fifth portion may be detachable; the first portion may be attached to the lateral bars 102*a-b* directly or indirectly by way of a fastener (not shown). In other embodiments, the rear harness 116 includes two loops into which the rear legs of the quadruped are inserted; the rear harness 116 may consist solely of those two loops. In some embodiments, the mobility aid 100 includes both the front harness 115 and the rear harness 116. The at least one harness 114 may be adjustable; in other words, one or more or the straps making up the at least one harness 114 may be adjustable.

As shown in FIG. 1B, the support frame 101 may include a sling 130 hung between the two lateral bars 102*a-b*. The sling 130 may include a flexible panel or sheet of material; the material making up the sheet may be any materials suitable for use in constructing the at least one harness 114 or the at least one strap 113 as described above. The sling 130 may be hung from the support frame 101 using at least one strap 131. In some embodiments, the sling 130 has an adjustable depth; for instance, the at least one strap 131 may be adjustable as described above in reference to FIG. 1A. The sling 130 may include additional straps (not shown) that go over the back of a quadruped to secure the quadruped to the sling; the additional straps may be adjustable, and may have fasteners permitting them to be attached over the back of the quadruped when the quadruped is in the sling.

The mobility aid 100 includes at least one leg member; in some embodiments, the at least one leg member 106*a-b* includes two leg members 106*a-b*. The at least one leg member 106*a* may be constructed from any material or combination of materials suitable for the construction of the lateral bars 102*a-b*. In some embodiments, the at least one leg member 106*a* has an adjustable length; in one embodiment, the length of the leg member 106*a* is adjustable if the portion of the leg member 106*a* between the joint 109*a* and the wheel 111*a-b* may be lengthened or shortened. The adjustable leg member 106*a* may be telescoping, as described above in reference to the lateral bars 102*a-b*. The adjustable leg member 106*a* may be slidably inserted through the joint 109*a*; the adjustable leg member 106*a* may be shortened by sliding it upward through the joint 109*a* and lengthened by sliding it downward through the joint 109*a*. There may be a latch, screw, or clamp to fix the adjustable leg at a particular length; the latch, screw, clamp, or similar structure may function as described above in reference to FIG. 1A regarding the lateral bars 102*a-b*. As a non-limiting example, where the leg 106*a* is telescoping, the latch, screw, clamp, or other item may fix one telescoping section relative to another telescoping section. As another example, the latch, screw, clamp, or other item may fix the leg member 106*a* relative to the joint 109*a*.

Each joint 109*a-b* permits the corresponding leg member 106*a-b* to pivot between an upright position and a resting position. The upright position is a position in which the at least one leg member 106*a* is capable of supporting the weight of the quadruped. The upright position may be substantially perpendicular to the support frame 101; the upright position may alternatively be at another angle with respect to the support frame 101. The resting position is a position in which the quadruped is lying on the ground. The resting position may be substantially parallel to the support frame 101. Each joint 109*a-b* may be a swivel. Each joint 109*a-b* may be a hinge. In some embodiments, each joint 109*a-b* has a first portion fixed to the rear bar 105 and a second portion fixed to one of the leg members 106*a-b*, and the first portion is connected to the second portion so that the first portion is free to rotate relative to the second portion through a range of motion permitting the at least one leg member 106*a* to move between the upright position and the resting position.

Each joint 109*a-b* further includes a biasing means 110*a-b* that urges the leg elements 106*a-b* toward the upright position. The biasing means 110*a-b* may be a spring, such as a coiled spring. The biasing means 110*a-b* may be a piece of elastic material, such as an elastic ligament. The biasing means 110*a-b* may be a weight; the weight may pull the leg element toward the upright position using a cable and pulley arrangement (not shown). In some embodiments, the biasing means 110*a-b* of each joint has an adjustable bias. As a non-limiting example, the biasing means 110*a-b* may include a lever that a user can push in one direction to increase the bias, for instance by winding the spring, and in a second direction to decrease the bias. In some embodiments, the bias sufficiently strong to move the leg element 106*a-b* into the upright position if the quadruped attempts to stand by pushing up and forward with its front legs.

The at least one leg member 106*a* may be attached near to the rear 101*b* of the support frame 101, to support the weight of a quadruped with disabled rear legs. In other embodiments, the at least one leg member 106*a* is attached near to the front 101*a* of the support frame 101, to support the weight of a quadruped having disabled front legs.

The mobility aid 100 includes at least one wheel 111*a* at the distal end 107*a* of the at least one leg member 106*a*. Where the at least one leg element 106*a* includes two leg elements 106*a-b*, the at least one wheel 111*a* may include two wheels 111*a-b*, one at the distal 107*a-b* of each of the leg elements 106*a-b*, resting on the ground. The at least one wheel 111*a* may be free to rotate. In some embodiments, the at least one wheel 111*a* has one or more elastic tires; the tires may be hollow and filled with gas like car or bicycle tires; the gas may be pressurized. The tires may be solid. In some embodiments, the tires are substantially inelastic. The wheels may be solid or have one or more spokes.

The mobility aid 100 includes at least one actuator 112*a* attached to the at least one leg element 106*a*, each actuator 112*a* contacting the ground on an opposite side of one of the at least one wheel 111*a* from the front end 101*a* of the support frame 101. The at least one actuator 112*a* may include two actuators 112*a-b*, one of which is connected to each of the two legs 106*a-b*. In one embodiment, the opposite side of the wheel from the front end 101*a* of the support frame 101 the side behind the wheels, where "behind" indicates past the wheels in the direction traversed from the front end 101*a* to the back end 101*b* of the support frame 101, as shown in FIGS. 1A-1B. Each of the actuators 112*a-b* may be constructed from any material or combination of materials suitable for the construction of the lateral bars 102*a-b* as described above in reference to FIG. 1A. In some embodiments, each actuator 112*a-b* has a proximal end attached to one of the leg members 102*a-b* and a distal end resting on the ground when the ground is substantially flat. Each actuator 112*a-b* may be rigidly attached to its corresponding leg member 106*a-b*. The proximal end may be attached where the hub of the wheel 111*a-b* is attached. The proximal end may be attached higher or lower than the hub of the wheel 111*a-b*. The proximal end may be attached to the axle of the wheel; in some embodiments, the at least one actuator 112*a-b* is free to pivot through a range of motion. The range of motion may be approximately 90 degrees. There may be a block 200 rigidly attached to the at least one leg member 106*a* that prevents the actuator 112*a-b* from rotating forward past a certain point. As a result, the actuator 112*a-b* may press against the block 200 and cause the leg member 106*a* to rotate forward when the mobility aid 100 moves backwards.

In some embodiments, the distal end of each actuator 112*a-b* has a tip that has a high degree of friction with the ground; the tip may have a high-friction shape, such as a spike or a shape with one or more ridges or cleats. The tip may be formed from an elastomeric substance such as rubber. In some embodiments, the tip has a shape that slides easily over the ground when the dog wheelchair is moving forward; the shape may be a tube or dowel having a cylindrical axis parallel to the ground. Where the actuator 112*a-b* is free to pivot to some extent, it may be able to rest more lightly on the ground until the quadruped reverses the mobility aid 100. Each actuator 112*a-b* may be a separate piece from the leg element 106*a-b* to which it is attached, by the use of welding, fasteners, or similar means of attachment. In other embodiments, each actuator 112*a-b* is an integral extension of the corresponding leg element 106*a-b*;

in other words, the leg element 106*a-b* and its corresponding actuator 112*a-b* may form a single, monolithic piece.

Figure 2A:
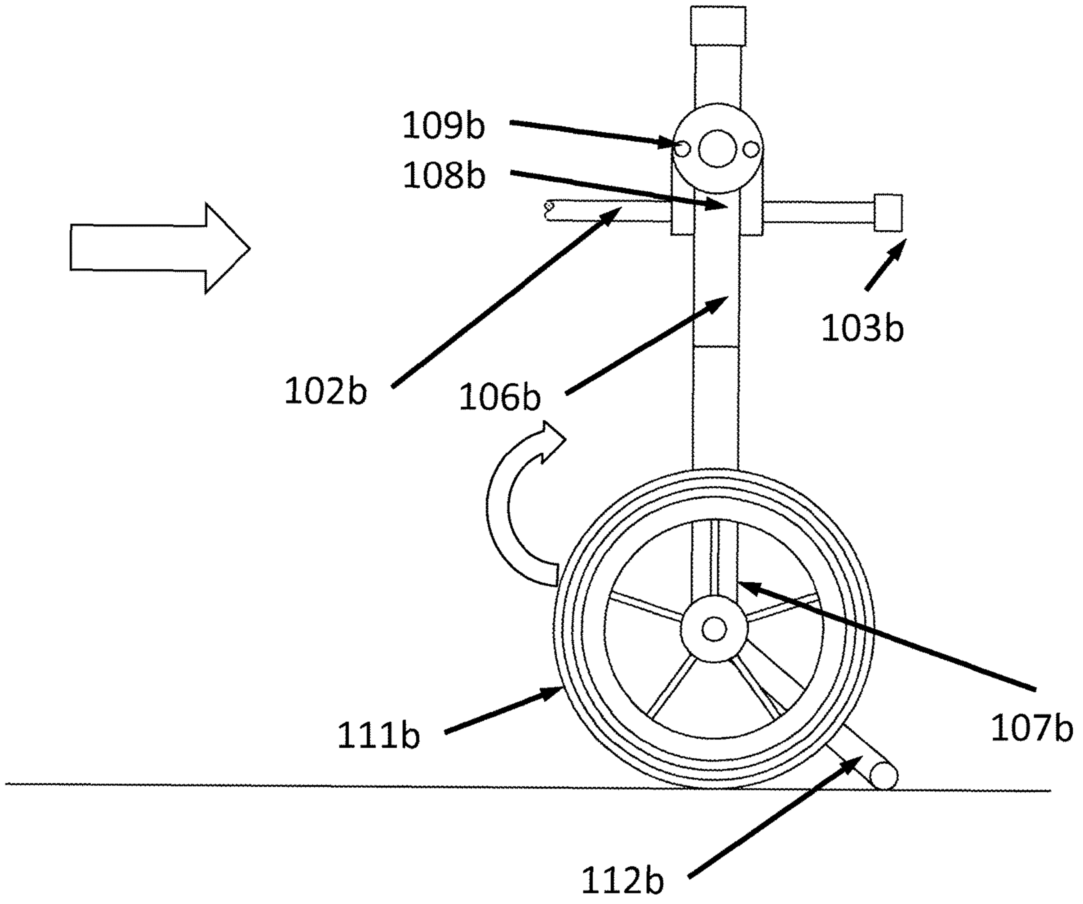
FIG. 2A is a schematic diagram depicting a detail of one embodiment of a mobility aid for quadrupeds in the process of collapse.
Figure 2B:
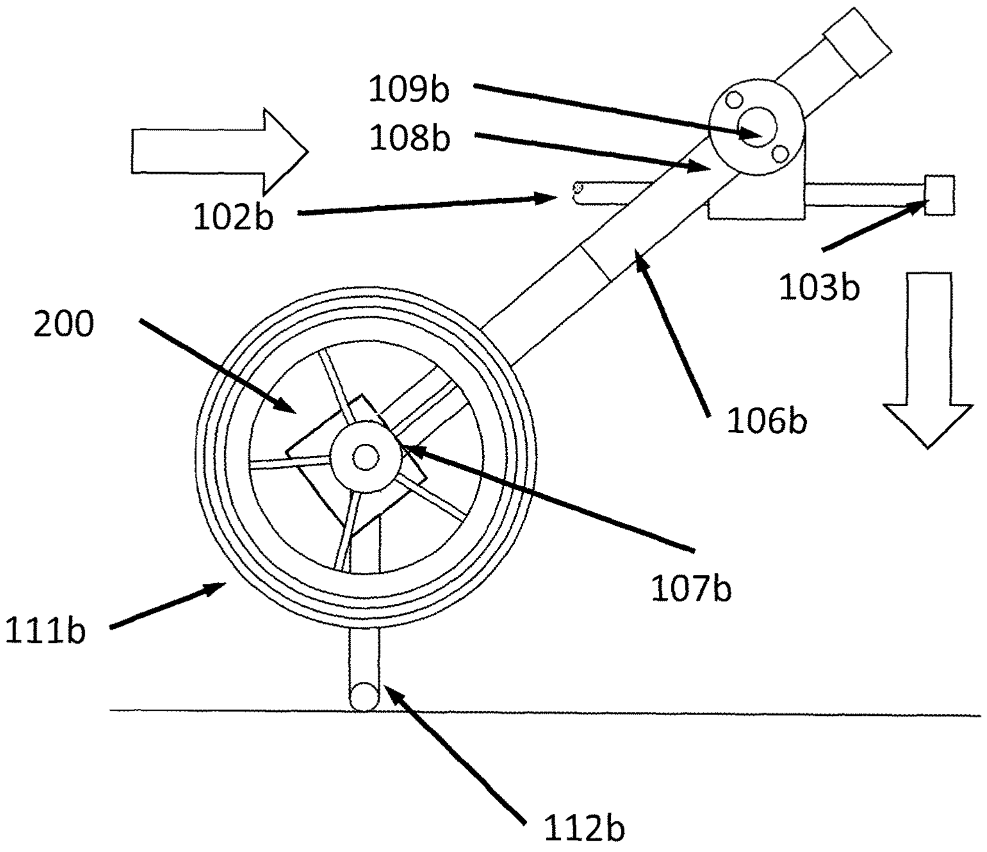
FIG. 2B is a schematic diagram depicting a detail of one embodiment of a mobility aid for quadrupeds in the process of collapse.

In some embodiments, as further shown in FIGS. 2A-B, each actuator engages with the ground when the quadruped walks in reverse, causing the distal end 107*a-b* of each leg member 106*a-b* to move forward relative to the support frame 101 and pivoting the leg member 106*a-b* at the joint. The at least one actuator 112*a-b* may be prevented from pivoting by the block 200. As a result, the leg member 106*a-b* may move into the resting position due to the continued reverse motion of the quadruped and the downward force of the weight of the quadruped; the consequence may be that the quadruped can learn to move voluntarily into a resting position by reversing direction. The quadruped may also learn to move voluntarily into the upright position by walking forward and upward using its forelegs. In some embodiments, the quadruped may also manipulate the mobility aid 100 into intermediate positions, such as the sitting position commonly adopted by dogs. The actuator 112*a-b* may also engage the ground to the forward side of the wheel 111*a-b* when the quadruped moves the mobility aid 100 forward from the resting position, helping to rotate the legs 106*a-b* back to the upright position.

In some embodiments, the mobility aid 100 includes a leg support 117. The leg support 117 may be attached to the support frame 101; the leg support may be attached near to the rear ends of the support frame 101 or near to the front end of the support frame. In some embodiments, the leg support functions to suspend the rear legs of a quadruped that has lost most of the use of its rear legs away from the ground; the purpose of the leg support may be to avoid damaging the disabled limbs and to improve mobility. In some embodiments, the leg support 117 includes at least one loop 118 of flexible material suspended from the support. The at least one loop 118 may be composed of any material or set of materials used to create the harness 114 or straps 113 as described above in reference to FIG. 1A. In some embodiments, the at least one loop 118 is suspended from the support frame using at least one strap 119. The strap 119 may be adjustable, as described above in reference to FIG. 1A. The loop 118 may be adjustable as well; for instance, the circumference of the loop may be increased or decreased to fit the loop around the hindleg of a particular quadruped. The loop 118 may include padding as described above in reference to FIG. 1A.

In some embodiments, the mobility aid 100 includes a suspension bar 120 attached to the support frame 101 near to the rear end of the two lateral bars 102*a-b*. The leg support may be suspended from the suspension bar 120. The suspension bar 120 may be on the opposite side of the rear bar 105 from the front ends 103*a-b* of the lateral bars 102*a-b*. The suspension bar 120 may be on the same side of the rear bar 105 as the front ends 103*a-b* of the lateral bars 102*a-b*. The suspension bar 120 may include a straight section parallel to the rear bar 105. The suspension bar 120 may include one or more straight sections parallel to the two lateral bars 102*a-b*. The suspension bar 120 may be composed of any material or combination of materials suitable for the composition of the two lateral bars 102*a-b*.

Figure 3:
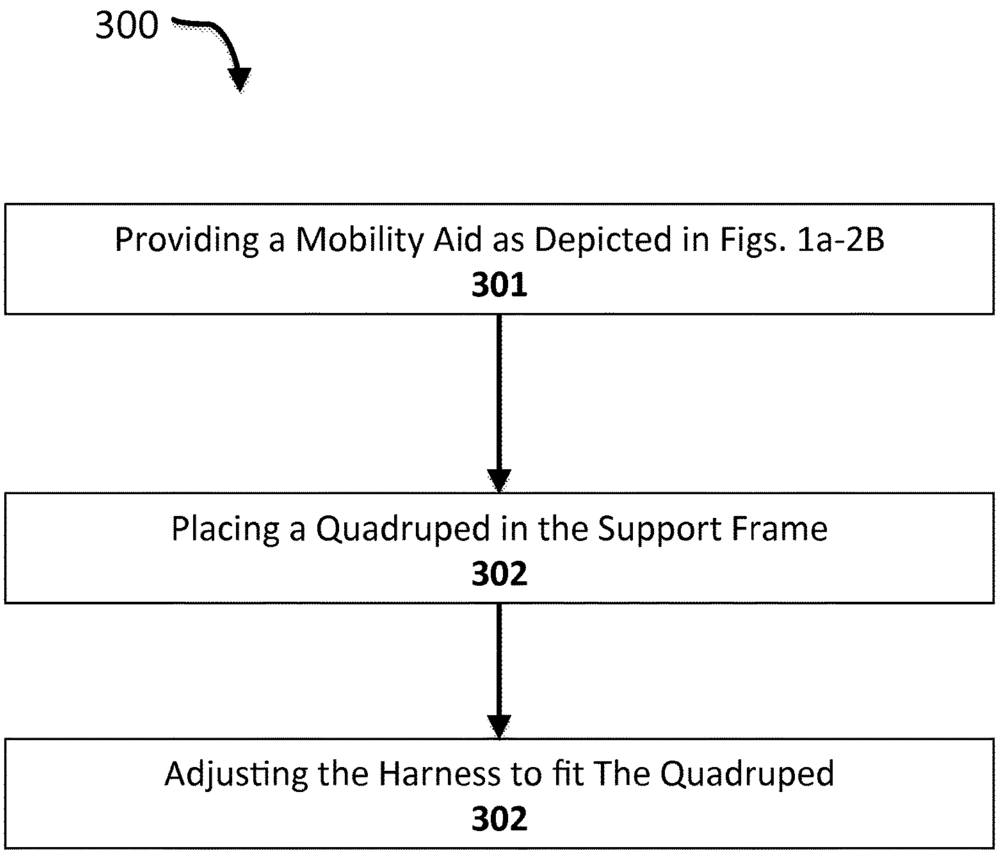
FIG. 3 is a flow diagram illustration an embodiment of a method for fitting a mobility aid to a quadruped.

FIG. 3 is a flow chart illustrating one embodiment of the disclosed method 300 for fitting a mobility aid to a quadruped. As a brief overview, the method 300 includes providing a mobility aid as described above in reference to FIGS. 1A-2B, further including at least one harness (301). The method 300 includes placing a quadruped within the support frame (302). The method 300 includes adjusting the harness to fit the quadruped (302). In some embodiments, where each biasing means 109*a-b* has an adjustable bias, the method 300 includes adjusting the bias of each biasing means 109*a-b*. In other embodiments, where the mobility aid further includes a leg support 117, the method 300 includes placing the hindlegs of the animal in the leg support 117. In other embodiments, where the lateral bars have adjustable length, the method also includes adjusting the length of the two lateral bars 102*a-b*.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A mobility aid for quadrupeds comprising:

a support frame comprising a front end and a rear end;

at least one leg member comprising a distal end and a proximal end connected to the support frame by a joint, the joint permitting the leg member to pivot between an upright position and a folded position, the joint further comprising a biasing means that urges the at least one leg element toward the upright position;

at least one wheel, with at least one axle, at the distal end of the at least one leg member;

at least one actuator attached to the at least one axle of said at least one wheel, such that said at least one actuator is free to pivot through a range of motion, wherein the motion of the at least one axle causes the at least one actuator to move over at least a portion of its range of motion, and said at least one actuator is able to contact the ground; and a block rigidly attached to the at least one leg member, wherein when said mobility aid moves backward, said at least one actuator contacts the ground, and said block is configured to press against said at least one actuator, preventing said at least one actuator from pivoting past a certain point, and causing said at least one leg member to move forward.

2. The mobility aid of claim 1, wherein the support frame further comprises two lateral bars having adjustable lengths.

3. The mobility aid of claim 2 further comprising a leg support attached to the support frame.

4. The mobility aid of claim 3, wherein the leg support comprises at least one loop of flexible material suspended from the support frame.

5. The mobility aid of claim 4, wherein the at least one loop is adjustable.

6. The mobility aid of claim 4, wherein the at least one loop is suspended from the support frame using an adjustable strap.

7. The mobility aid of claim 3 further comprising a suspension bar attached to the support frame near to the rear end of the lateral bars, wherein the leg support is suspended from the suspension bar.

8. The mobility aid of claim 1, wherein the support frame further comprises a sling hung from the support frame.

9. The mobility aid of claim 8, wherein the sling has an adjustable depth.

10. The mobility aid of claim 1 further comprising at least one strap to secure a quadruped in the support frame.

11. The mobility aid of claim 1 further comprising at least one harness to secure a quadruped in the support frame.

12. The mobility aid of claim 11, wherein the at least one harness further comprises a front harness to secure said quadruped.

13. The mobility aid of claim 11, wherein the at least one harness further comprises a rear harness to secure said quadruped.

14. The mobility aid of claim 11, wherein the at least one harness is adjustable.

15. The mobility aid of claim 1, wherein the at least one leg member has an adjustable length.

16. The mobility aid of claim 1, wherein the biasing means of the joint has an adjustable bias.

17. A method for fitting a mobility aid to a quadruped, the method comprising:

providing a mobility aid according to claim 1 further comprising at least one harness;

placing a quadruped with at least one hindleg and at least one foreleg in the support frame; and adjusting the harness to fit the quadruped.

18. The method of claim 17, further comprising adjusting the bias of each biasing means.

19. The method of claim 17, wherein the mobility aid further comprises a leg support, and further comprising placing at least one hindleg of the animal in the leg support.

20. The method of claim 17, wherein the support frame further comprises two lateral bars having adjustable length, and further comprising adjusting the length of the two lateral bars.

* * * * *